United States Patent Office 3,038,767
Patented June 12, 1962

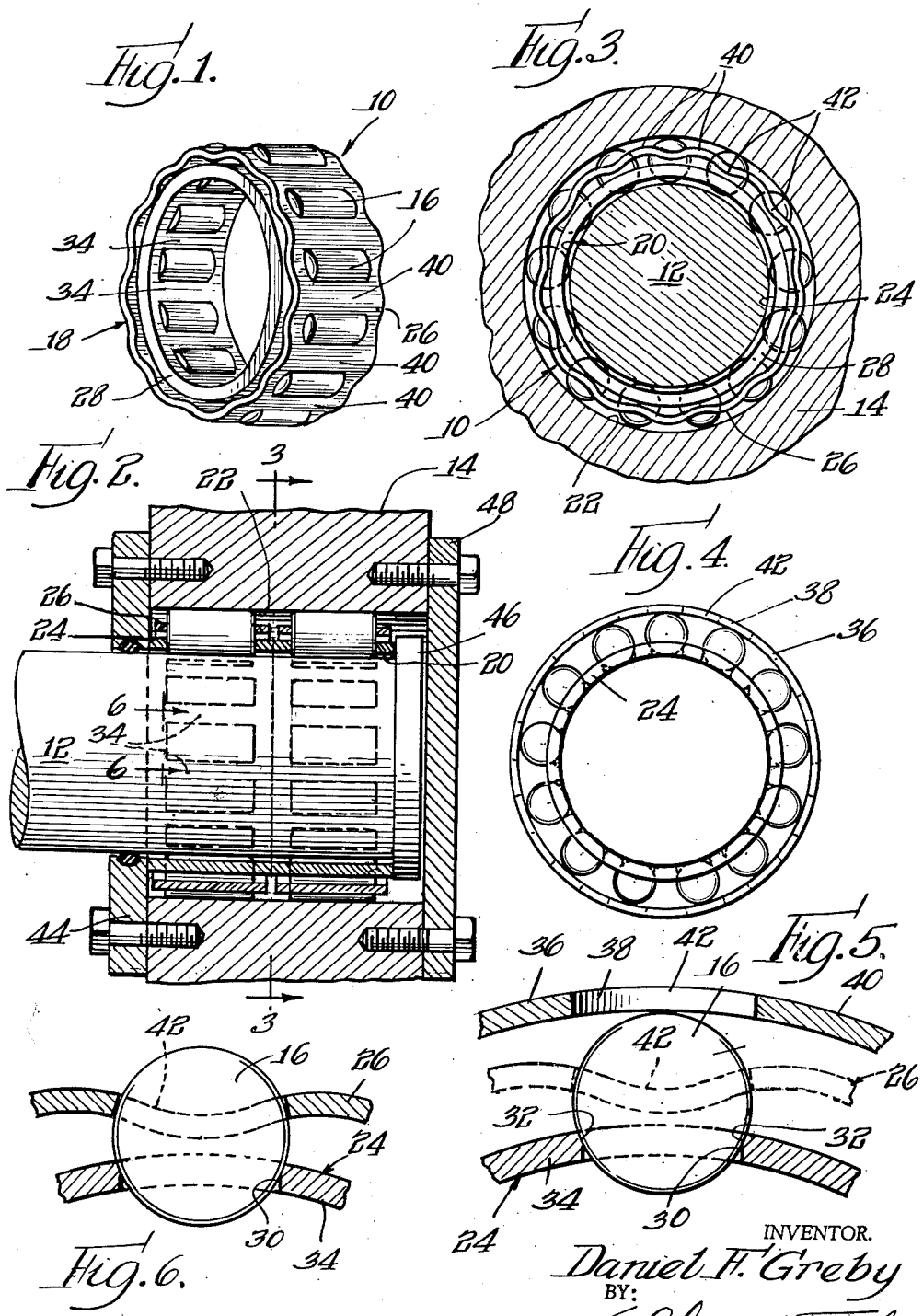

3,038,767
ROLLER BEARING WITH UNDULATED RETAINER
Daniel F. Greby, Chicago, Ill., assignor to Parkersburg-Aetna Corporation, Chicago, Ill., a corporation of West Virginia
Filed Mar. 4, 1959, Ser. No. 797,187
3 Claims. (Cl. 308—217)

The present invention relates to roller bearings.

One object of the invention is to provide an improved roller bearing cage assembly of very simple and inherently economical construction which contains an annular set of bearing rollers in assembled relation to each other independently of a bearing race.

Another object is to provide an improved and exceptionally economical roller bearing cage assembly of the above character which has an advantageous capacity, by virtue of an improved construction capable of sustaining substantial axial loads, to serve when installed as an axial spacer element between coacting structural parts contiguous to opposite ends of the cage assembly. A related object is to provide an improved roller bearing cage assembly of the character recited which provides for a particularly advantageous usage of a plurality of the improved assemblies in an adjacent, end-to-end relationship to provide any radial bearing strength desired, all without any necessity for using grooved bearing races.

A further object of the invention is to produce in an extremely economical manner roller bearing cage assemblies of the above character.

Other objects and advantages will become apparent from the following description having reference to the drawings in which:

FIG. 1 is a perspective view of a bearing cage assembly constructed in accordance with the invention;

FIG. 2 is a partially sectioned side view of a journal incorporating an adjacent pair of the improved roller bearing cage assemblies;

FIG. 3 is a transverse sectional view taken along the line 3—3 of FIG. 2;

FIG. 4 is an end view of the improved bearing assembly in an intermediate stage of assembly;

FIG. 5 is a fragmentary transverse sectional view of an enlarged scale illustrating two steps in the manufacture of the improved assembly; and FIG. 6 is a fragmentary sectional view on an enlarged scale of the bearing assembly taken along the line 6—6 of FIG. 2.

The improved roller bearing assembly 10 illustrated in FIG. 1 and constructed in accordance with the present invention is designed for journaling two machine parts 12 and 14, as illustrated for example in FIGS. 2 and 3, without the necessity for using grooved bearing races for coacting with the bearing rollers 16. The cage assembly 10 is manufactured and sold as a self-contained unit in which an annular series of bearing rollers are retained in a cage 18.

When installed to form a journal between the machine parts 12 and 14 as shown, the cage assembly 10 is mounted in the radial space between an annular roller engaging surface 20 on the inner machine element 12 and an encircling annular surface 22 on the outer machine element 14.

The cage assembly 10 including the bearing rollers 16 may be of any desired size. Its structure is extremely simple. Aside from the rollers 16 the number and size of which are determined by the size and bearing strength capacity of the bearing to be formed, the cage assembly 10 consists of only an inner annular retaining band constituting a thrust cylinder 24 encircled by an outer retaining band 26 having a generally cylindrical yet undulated shape to be described presently in greater detail.

Both the inner thrust cylinder 24 and the retaining band 26 have a length somewhat greater than that of the bearing rollers 16 so that the marginal end edges of the cylinder and band extend somewhat beyond the bearing rollers as shown.

The inner thrust cylinder 24 is adapted to sustain a substantial end load or thrust and for this purpose is formed of a relatively thick or heavy gauge metal stock. Also the inner thrust cylinder 24 is made slightly longer than the bearing retaining band 26 so that opposite ends of the cylinder project slightly beyond opposite ends of the band, as shown in FIG. 2.

Each end of the inner thrust cylinder 24 which projects slightly beyond the retaining band 26, as mentioned, defines a flat annular bearing surface 28 having sufficient radial width (provided by the rather thick structure of this cylinder) and hence sufficient surface area to sustain efficiently a substantial end load or thrust applied to opposite ends of the thrust cylinder, as will be presently referred to in greater detail. The thrust cylinder 24 may be made of steel or other suitable material, such as porous bronze impregnated with lubricant.

The inner diameter of the cylinder 24 is slightly greater than that of the annular journal surface 20, FIG. 3, to be encircled and engaged by the rollers 16.

The annular series of circumferentially spaced bearing rollers 16 are cradled in a corresponding series of rectangular openings 30 formed in the thrust cylinder 24. Each of the cylinder openings 30 has a length along the cylinder which exceeds the length of the corresponding roller 16 only by a slight amount sufficient to accommodate and provide for free rotation of the roller.

The width of each opening 30, measured circumferentially with respect to the cylinder 24, is substantially less than the diameter of a roller 16 but sufficient to allow each roller 16 to protrude inwardly somewhat beyond the inner surface of the thrust cylinder. The longitudinal marginal edges of each opening 30 opposing the adjacent roller 16 are beveled as indicated by the numerals 32 in FIG. 5, to have smooth surface engagement with the roller.

The structure of the thrust cylinder 24 remaining between the roller openings 30 forms a series of arcuate spacer elements 34 extending between opposite ends of the thrust cylinder.

The roller retaining band 26 is formed from a smooth cylindrical blank 36, FIG. 4, having a length equal to that of the retaining element 26 to be formed and having an initial diameter substantially greater than the maximum diameter of the retaining band 26 in its final form.

A circumferentially spaced series of rectangular apertures 38, FIGS. 4 and 5, corresponding to the respective rollers 16, are formed in the cylindrical blank 36 in circumferential alignment with the respective thrust cylinder openings 30. The openings 38 are substantially equal in length to the openings 30. However, the width of the apertures 38, exceeds the diameter of the respective rollers sufficiently to permit insertion of the rollers radially through the outer openings 38 to rest in the thrust cylinder apertures 30, as illustrated in FIG. 5.

The structure of the cylindrical blank 36 remaining between the circumferentially spaced outer apertures 38 forms a series of roller retaining plate elements 40 extending between opposite ends of the blank. Adjacent ends of the retaining plate elements 40 are connected by arcuate bridges 42 formed by the marginal end edges of the cylindrical blank at opposite ends of the roller inserting apertures 38.

It will be appreciated that both the inner thrust cylinder 24 and the outer cylindrical blank 36 used to form the bearing retaining band 26 are quite simple and economical to manufacture. The thrust cylinder 24 can be formed from a section of seamless metal tubing cut to length and apertured to form the roller cradle openings 30. The cylinder blank 36 is similarly formed of cylindrical stock of a much lighter guage than the thrust cylinder, cut to length and apertured to form the circumferentially spaced apertures 38.

The thrust cylinder 24 and the cylindrical blank 36 are placed in concentric relation to each other and the rollers 16 inserted through the apertures at 38 as described. All this is quite simple and economical to accomplish from the manufacturing standpoint. Then by a very simple operation the apertures 38 in the cylindrical blank 36 are narrowed to a width less than the diameter of the rollers 16 and the circumference of the cylindrical blank 36 is contracted to have a maximum diameter less than that of the outer journal surface 22 which encircles and engages the rollers 16 upon installation of the bearing as shown in FIGS. 2 and 3. In other words, the width of each aperture measured along the contracted diameter of the outer retaining band disposed radially outwardly of a circle through the axes of the bearing rollers is less than the diameter of the bearing rollers as the result of the inward deformation of the bridges.

The operation consists essentially of pressing the connecting bridges 42 on opposite ends of the cylindrical blank 36 to deform the same radially inward toward the thrust cylinder 24, as shown in dotted lines in FIG. 5. The increased curvature of the bridges 42 which are bowed radially inward by this operation to have the shape illustrated in FIGS. 3 and 6, pulls the adjacent retaining plate portions 40 toward each other to have a reduced spacing therebetween which becomes the width of the apertures and is less than the diameter of the rollers 16. The length of the inner edges of the bridges, as measured along the deformed edge portions, remains at least equal to the diameter of the bearing rollers.

This completes manufacture of the improved roller bearing cage assembly 10 in which the rollers 16 are retained between the thrust cylinder 24 and the undulated retaining band 26 independently of a bearing race.

As previously mentioned, the cage assembly 10 thus formed is installed in a manner such that the rollers 16 roll on concentric annular surfaces formed on the machine parts journaled by means of the cage assembly.

FIGS. 2 and 3, which have been referred to previously, illustrate the installation of a pair of identical cage assemblies 10 in an adjacent end-to-end relationship encircling the cylindrical journal surface 20 on the machine element 12. The internal journal surface 22 on the machine element 14, which encircles the rollers 16, extends longitudinally across both cage assemblies.

As shown, adjacent ends of the thrust cylinders 24 of the two cage assemblies 10 abut against each other to maintain the desired longitudinally spaced relationship of the two cage assemblies relative to each other.

Also, the outer end of the left hand cage assembly 10, as shown in FIG. 2, is engaged by the inner periphery of an annular retaining plate 44 secured to the machine element 14 in encircling relation to the machine element 12. The opposite or right hand end of the thrust cylinder 24 of the other cage element 10 engages a radial flange 46 on the adjacent end of the machine element 12. As shown in this illustrative installation, the right hand end of the machine element 12 is engaged and prevented from moving to the right relative to the machine element 14 by a cover plate 48 affixed to the machine element 14 and extending across the adjacent end of the element 12.

Thus with reference to this typical installation, the two cage assemblies 10 located between the radial flange 46 of the machine element 12 and the annular retainer 44 on the machine element 14 serve as spacers which retain the cage assemblies in their proper longitudinal positions and at the same time preclude longitudinal shifting of the machine element 12 to the left relative to the machine element 14, all this being achieved without the use of grooved bearing races. The journal shown in FIGS. 2 and 3 is, of course, only illustrative of installations in which the roller bearing cage assemblies 10 can be used to advantage.

The invention is claimed as follows:

1. A roller bearing cage assembly comprising, in combination, a thrust cylinder formed of thick material and defining at opposite ends thereof two flat annular thrust bearing surfaces, said thrust cylinder defining therein a circumferentially spaced series of longitudinal openings, a series of bearing rollers nested in the radially outward side of the respective openings and protruding therethrough beyond the inner surface of said thrust cylinder, said bearing rollers being larger in diameter than the width of the respective thrust cylinder openings, a generally cylindrical bearing roller retaining band encircling said series of bearing rollers in radially outward spaced relation to the axes of the rollers, said retaining band having an axial length slightly less than that of said thrust cylinder and terminating at opposite ends axially inward of said thrust bearing surfaces on the corresponding ends of said cylinder, said retaining band defining a circumferentially spaced series of longitudinal apertures therein corresponding to said respective bearing rollers and providing for protrusion of the respective rollers through the retaining band, circumferentially spaced portions of opposite end edges of said retaining band located at opposite ends of said respective retaining band apertures being deformed radially inward to contract the retaining band apertures to have a width individually less than the diameter of the individual bearing rollers and to contract the diameter of the retaining band sufficiently to cause said bearing rollers to protrude through said retaining band apertures outwardly beyond the band, and said cylinder and band being free of any physical interconnection therebetween other than the engagement of said rollers with the cylinder and band.

2. A roller bearing cage assembly comprising in combination, an inner cylinder and an outer retaining band of generally cylindrical form disposed in concentric relation to each other and having substantial radial space therebetween, said inner cylinder and said retaining band respectively defining two corresponding series of circumferentially spaced longitudinal openings therein, a plurality of bearing rollers nested in said respective corresponding openings of both said series and having axes located between said inner cylinder and said retaining band, opposite ends of said inner cylinder extending axially beyond opposite ends of said retaining band and defining flat annular bearing surfaces of substantial radial width located axially beyond the corresponding extreme axial ends of said retaining band, said bearing rollers protruding through said respective series of openings inwardly beyond said inner cylinder and outwardly beyond said retaining band, said bearing rollers having an individual diameter exceeding the width of the adjacent cylinder and retaining band openings whereby the cylinder, rollers and band are mutually retained together in assembled relation to each other, and said cylinder and said band being free of any physical interconnection therebetween other than the engagement of said rollers with the cylinder and the band.

3. A self-contained roller bearing assembly comprising, in combination, an inner annular retaining band having a circumferentially spaced series of axially extending openings therethrough, a series of bearing rollers each having a diameter greater than the width of said openings and disposed in a corresponding opening to project radially inwardly of the said inner retaining band, and an outer retaining band encircling the series of bearing rollers outwardly of said inner retaining band and having a circumferentially spaced series of axially extending apertures therethrough corresponding to respective bearing rollers, said outer retaining band having the edge portions thereof located at opposite ends of said apertures deformed inwardly to form bridges with the length of the inner edge of each bridge, as measured along said deformed edge portion, being at least equal to the diameter of the bearing rollers and with the width of each aperture radially outwardly of a circle through the axes of the bearing rollers being less than the diameter of the bearing rollers as the result of the inward deformation of said bridges whereby the inner retaining band, outer retaining band and bearing rollers are mutually retained in assembled relationship with the bearing rollers projecting radially beyond the portions of the outer retaining band between adjacent bearing rollers.

References Cited in the file of this patent

UNITED STATES PATENTS

| | | | |
|---|---|---|---|
| 749,192 | Hillcoat | Jan. 12, | 1904 |
| 1,147,497 | Freed | July 20, | 1915 |
| 1,254,332 | Lindhe | Jan. 22, | 1918 |
| 1,533,746 | Lott | Apr. 14, | 1925 |
| 1,822,053 | Marles | Sept. 8, | 1931 |
| 1,947,004 | Goodard et al. | Feb. 13, | 1934 |
| 2,540,283 | Parsons | Feb. 6, | 1951 |

FOREIGN PATENTS

| | | | |
|---|---|---|---|
| 105,073 | Great Britain | Nov. 29, | 1917 |